United States Patent [19]

Yasuda

[11] Patent Number: 5,357,435
[45] Date of Patent: Oct. 18, 1994

[54] TRACTION CONTROL SYSTEM FOR AUTOMOTIVE VEHICLES

[75] Inventor: Sota Yasuda, Kanagawa, Japan

[73] Assignee: Nissan Motor Company, Ltd., Yokohama, Japan

[21] Appl. No.: 997,064

[22] Filed: Dec. 28, 1992

[30] Foreign Application Priority Data

Dec. 27, 1991 [JP]  Japan .................................. 3-346600

[51] Int. Cl.$^5$ ............................................. B62D 6/00
[52] U.S. Cl. ............................. 364/426.03; 180/140; 180/141; 180/142; 180/282
[58] Field of Search ..................... 364/426.03, 426.01, 364/426.02; 180/140, 141, 142, 282

[56] References Cited

U.S. PATENT DOCUMENTS

| | | | |
|---|---|---|---|
| 4,848,851 | 7/1989 | Kuraoka et al. | 303/100 |
| 4,971,164 | 11/1990 | Fujita et al. | 180/197 |
| 4,998,593 | 3/1991 | Karnopp et al. | 180/140 |
| 5,079,708 | 1/1992 | Brown | 364/424.05 |
| 5,105,360 | 4/1992 | Akiyama | 364/426.03 |
| 5,140,524 | 8/1992 | Matsuda | 364/426.02 |
| 5,172,961 | 12/1992 | Inoue et al. | 303/100 |
| 5,197,008 | 3/1993 | Itoh et al. | 364/426.01 |
| 5,225,984 | 7/1993 | Nakayama | 364/424.05 |
| 5,245,542 | 9/1993 | Itoh et al. | 364/426.02 |

FOREIGN PATENT DOCUMENTS

| | | |
|---|---|---|
| 58-122246 | 7/1983 | Japan . |
| 63-31859 | 2/1988 | Japan . |
| 64-44369 | 2/1989 | Japan . |

*Primary Examiner*—Thomas G. Black
*Assistant Examiner*—Julie D. Day
*Attorney, Agent, or Firm*—Lowe, Price, LeBlanc & Becker

[57] ABSTRACT

A traction control system for an automotive vehicle comprises, a brake fluid pressure control actuator associated with at least driven wheels for reducing traction created through the driven wheels, and sensors for monitoring an acceleration-slip state of at least one of the driven wheels. A recovery control unit is arranged for deriving a degree of turn of the vehicle, and for deriving a rate of change in the vehicle turning degree. The recovery control unit is responsive to the change-rate in the turning degree during an acceleration-slip control, for controlling traction in a transient state shifting from turning to straight-ahead driving, in such a manner as to increase a recovery amount of driving torque caused by the driven wheel as the turning degree is weakened.

8 Claims, 5 Drawing Sheets

TRACTION CONTROL SYSTEM FOR AUTOMOTIVE VEHICLES

BACKGROUND OF THE INVENTION

1. Field of the Invention

The present invention relates to an automotive traction control system applied for suppressing acceleration-slip occurring at driven wheels during quick depressing operation of the accelerator pedal, such as quick starting, quick acceleration, or the like, and specifically to a system being capable of suppressing acceleration-slip through a traction brake control according to which excessive driving force exerted on the driven wheels is suppressed via a brake fluid pressure generated by an external brake fluid pressure source and/or through a traction throttle control according to which the excessive driving force is suppressed by changing a throttle opening angle and a throttle opening and closing speed.

2. Description of the Prior Disclosure

Recently, there have been disclosed and developed various automotive traction control systems, in which the increase, holding, or decreasing in a wheel-cylinder pressure can be independently carried out in left and right driven wheels during acceleration slip, by means of an external brake fluid pressure source generating a brake fluid pressure irrespective of depression of the brake pedal. One such conventional traction control system had been disclosed in Japanese First Publication Tokkai Showa 63-31859. The conventional traction control system teaches a variable target slippage control for a driven wheel depending upon a vehicle running condition, such as a straight-ahead driving or cornering. In the embodiment of the Japanese First Publication Tokkai Showa 63-31859, the control unit variably controls the target slip value for the driven wheel, such that the target slip value utilized during straight-ahead driving is set at a higher value than that utilized during cornering, so as to assure a sufficient driving force during straight-ahead driving and to provide a high cornering stability. The conventional traction control system tends to easily transit to an acceleration slip control during cornering. In contrast to the above, the conventional traction control system tends not to easily transit to the acceleration slip control during straight-ahead driving. Therefore, the conventional traction control system has some drawbacks as herebelow described in detail.

In case that the target slip value for the driven wheel has been properly tuned at a low level depending on change in the vehicle running condition from the straight-ahead driving state to the cornering state, a target slip value recovery is retarded when the vehicle running condition returns again from the cornering state to the straight-ahead driving state, since a low tuned target slip value is maintained until the running condition completely transits to the straight-ahead driving state.

In case that the target slip value for the driven wheel has been properly tuned at a high level depending on change in the vehicle running condition from the cornering state to the straight-ahead driving state, a cornering stability is reduced when the vehicle running condition returns again from the straight-ahead driving to the cornering state, since a high tuned target slip value is maintained within a transient state shifting from the straight-ahead driving state to the cornering state.

SUMMARY OF THE INVENTION

It is, therefore, in view of the above disadvantages, an object of the present invention to provide an automotive traction control system for suppressing an excessive slippage during acceleration slip through a throttle control, a brake control, or the like, which can assure a proper balance between an acceleration performance and a covering stability in a transient state shifting from the cornering state to the straight-ahead driving state.

It is another object of the invention to provide an automotive traction control system which can increase a recovery amount of driving torque of the driven wheel, as a degree of turning is decreased, so as to insure a high cornering stability in the former half of the vehicle turning and to provide a high acceleration performance in the latter half of the vehicle turning.

It is a further object of the invention to provide an automotive traction control system which can insure quick and optimal recovery of driving torque applied to a driven wheel, in a transient state from the straight-ahead driving state to the cornering state.

In order to accomplish aforementioned and other objects, a traction control system for an automotive vehicle comprises a traction reducing means for reducing traction created through at least one driven wheel, the traction reducing means being operated during an acceleration-slip control, an acceleration-slip detecting means for monitoring an acceleration-slip state of at least one driven wheel, a turning degree deriving means for deriving a degree of turn of the vehicle, a change-rate derivation means for deriving a rate of change in the turning degree, and a driving-torque recovery control means for increasingly compensating a recovery amount of driving torque created by the at least one driven wheel in accordance with a decrease in the turning degree of the vehicle, during the acceleration-slip control when the recovery control means determines on the basis of the rate of change in the turning degree that the vehicle is in a transient state from turning to straight-ahead driving.

According to another aspect of the invention, a traction control system for an automotive vehicle comprises a traction reducing means for reducing traction created through at least one driven wheel, the traction reducing means being operated during an acceleration-slip control, an acceleration-slip detecting means for monitoring an acceleration-slip state of the at least one driven wheel, a turning degree deriving means for deriving a degree of turn of the vehicle, a change-rate derivation means for deriving a rate of change in the turning degree, and a driving-torque recovery control means for increasingly compensating a recovery amount of driving torque created by the at least one driven wheel in linear proportion to an increase in a negative changerate in the turning degree, during the acceleration-slip control when the recovery control means determines on the basis of the rate of change in the turning degree that the vehicle is in a transient state from turning to straight-ahead driving.

The turning degree may be derived as an estimate of turning radius of the vehicle, based on a lateral acceleration and a mean value between a front-right wheel speed and a front-left wheel speed. Alternatively, the turning degree may be derived on the basis of a steering angle or a yawing rate. The change-rate in turning degree may be derived from the difference of turning degree between two consecutive turning degrees periodically derived at a predetermined period of time. The recovery control means operates the traction reducing means in the transient state shifting from turning to straight-ahead driving during the acceleration-slip control, such that a brake fluid pressure in each driven wheel cylinder is reduced linearly in proportion to the magnitude of the recovery amount. The traction control system may further comprise tandem throttle valves, namely a first throttle valve being operated in synchronization with depression of an accelerator pedal and a second throttle valve being drivingly controlled by a motor. In addition to the above traction brake control, the recovery control means may operate the traction reducing means in the transient state shifting from turning to straight-ahead driving during the acceleration-slip control, such that a throttle opening angle of the second throttle valve is increased linearly in proportion to the magnitude of the recovery amount. The recovery control means may operate the traction reducing means in the transient state shifting from turning to straight-ahead driving during the acceleration-slip control, such that a throttle opening speed of the second throttle valve is increased in linearly proportion to the magnitude of the recovery amount.

DESCRIPTION OF THE PREFERRED EMBODIMENTS

Figure 1:
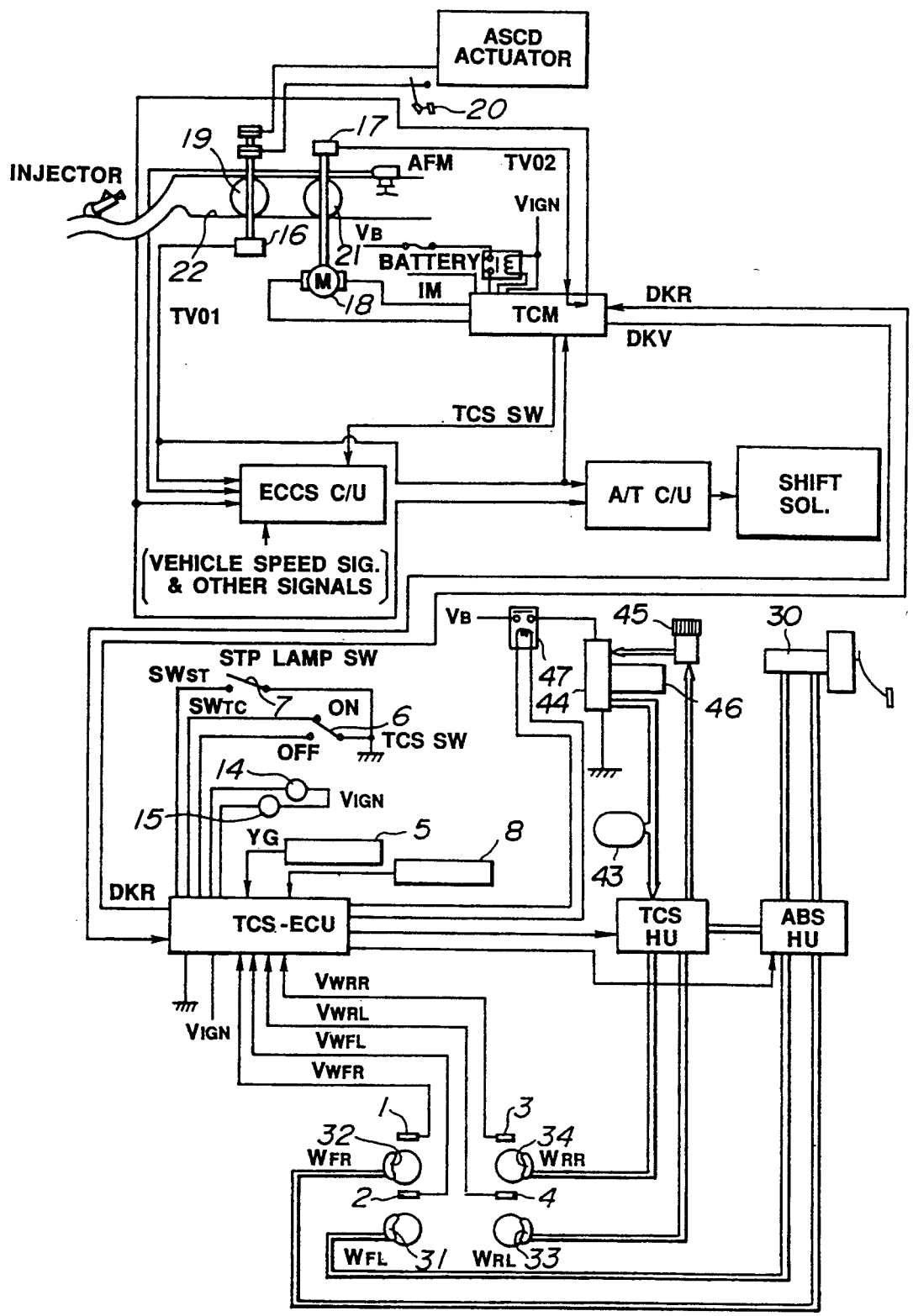
FIG. 1 is a system diagram illustrating a preferred embodiment of a control system for braking and driving systems for a rear-wheel drive vehicle which employs a traction control system according to the invention.

Referring now to the drawings, particularly to FIG. 1, there are shown various control system, namely a traction control system generally abbreviated as a TCS including a throttle control system which can perform a throttle valve opening angle control for suppressing excessive driving force exerted on driven wheels is such a manner as to maintain the slip ratio of each rear driven wheel within a predetermined criterion during acceleration-slip, as well as an acceleration slip brake control system which can perform a brake control for automatically and actively controlling braking forces applied to rear-left and rear-right driven wheels depending on the respective slip ratios during acceleration slip so as to prevent wheel-spin, and an anti-skid brake control system generally abbreviated as an ABS which is provided for preventing brakes from locking road wheels during deceleration slip, such as quick braking or braking on a low frictional road surface so as to provide maximum effective braking. The centralized control for the above noted control systems is performed by means of an electronic control unit applied commonly to both the TCS and ABS. The electronic control unit will be hereinafter referred to as a TCS-ECU.

The centralized control unit TCS-ECU is associated with an electronic engine centralized control system serving as one peripheral system of the TCS. The electronic engine centralized control system includes an air flow meter AFM, an electronic engine centralized control unit ECCS C/U and fuel injectors to achieve a fuel injection control, and ignition timing control, and an idling speed compensation, for example.

The centralized control unit TCS-ECU is associated with an automatic transmission control system serving as the other peripheral system of the TCS. The automatic transmission control system includes the automatic transmission control unit A/T C/U and shift solenoids connected to the A/T C/U to achieve a gear shift control, such as a shift-up operation, a shift-down operation, and a lock-up control in the case of a lock-up torque converter employing a lock-up mechanism which is operable for directly and mechanically interconnecting a turbine runner and a converter cover to transmit torque from an engine crankshaft directly to the turbine runner during vehicle running at a relatively high speed greater than a predetermined vehicle speed. The TCS-ECU is also associated with an automatic speed control system serving as the other peripheral system of the TCS. The automatic speed control system is generally abbreviated as an ASCD and employs an ASCD actuator to achieve an auto-cruise control according to which the vehicle speed is automatically held at a desired constant speed.

Each of the above noted engine centralized control unit ECCS C/U and the automatic transmission control unit A/T C/U receives the switch ON signal $SW_{TC}$ indicative of an ON state of a TCS switch 6 and representing whether the traction control is executed, a first throttle opening angle indicative signal TVO1 and a second throttle opening angle signal TVO2. When the engine centralized control unit ECCS C/U receives the signal TCS SW, the engine centralized control system generally selects a lower one of the first and second throttle opening angles TVO1 and TVO2 in order to achieve a transient traction control. Such a selection control is generally referred to as a low-select control for a throttle opening angle. As seen in FIG. 1, the traction throttle control is performed by utilizing first and second throttles set in tandem. The low-select control is executed as a relevant control during the traction control with the tandem throttle. Upon starting of the low-select control relevant to the traction control, the engine centralized control system operates to terminates the cruise control executed by the ASCD, a canister control and an exhaust gas recirculation control (EGR) control, for example.

The previously noted TCS-ECU receives various signals, namely four wheel speed signals $V_{WFR}$, $V_{WFL}$, $V_{WRR}$, $V_{WRL}$, respectively generated from a front-right wheel speed sensor 1, a front-left wheel speed sensor 2, a rear-right wheel speed sensor 3 and a rear-left wheel speed sensor 4, and a lateral acceleration signal YG generated from a lateral acceleration sensor 5, a switch signal $SW_{TC}$ generated from a TCS switch 6, a switch signal $SW_{ST}$ generated from a brake lamp switch 7, an actual throttle opening angle signal DKV generated by a throttle control module TCM and representative of an actual throttle opening angle of a first throttle valve 19, and a signal generated from a L terminal 8 of an alternator through which an engine speed is derived. The TCS-ECU makes a judgment based on the received signals which one of an acceleration-slip state, a deceleration-slip state, and a non-slip state the vehicle is the vehicle operating in. When the TCS-ECU determines that the vehicle is in the acceleration-slip state, the TCS-ECU outputs a target throttle opening angle signal DKR indicative of a target throttle opening angle for a second throttle valve 21 to the TCM in order to approach an actual second throttle opening angle TVO2 of the second throttle 21 to the target throttle opening angle signal value DKR. The second throttle opening angle indicative signal TVO2 is output by means of a second throttle opening angle sensor 17.

Figure 2:
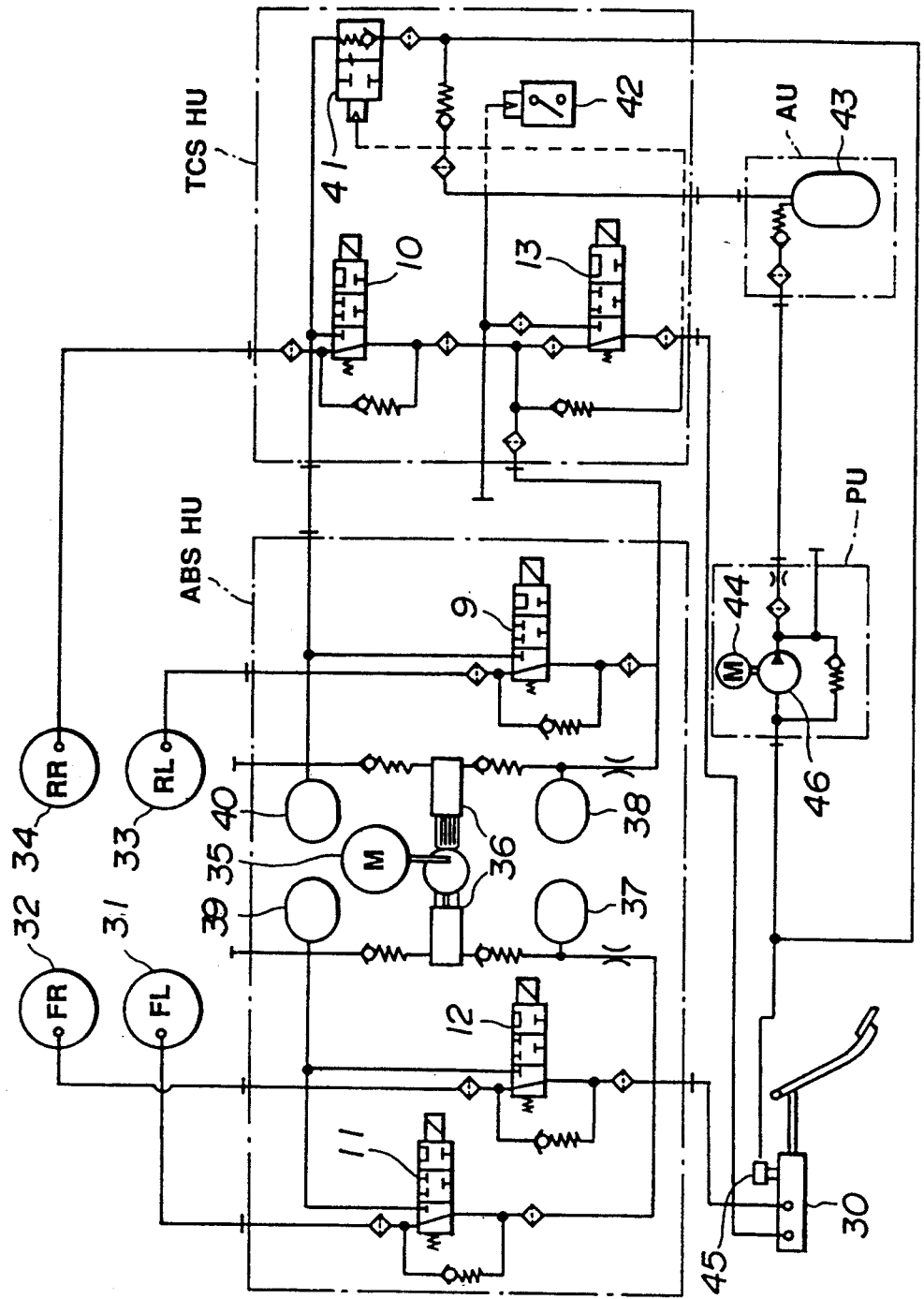
FIG. 2 is a hydraulic circuit diagram illustrating a brake pressure control system of the preferred embodiment applied commonly to a TCS brake control for driven wheels and an ABS brake control for four road wheels.

As seen in FIG. 2, during acceleration slip, the TCS-ECU also outputs a control command serving as a solenoid activating and deactivating signal to respective solenoid valves 9 and 10 employed in a hydraulic unit TCS-HU for a traction brake control system, so as to prevent acceleration-slip occurring at the rear driven wheels. During deceleration slip, such as quick braking, the TCS-ECU also outputs a control command serving as a solenoid activating and deactivating signal to each of solenoid valves 11 and 12 respectively associated with the front-left and front-right wheel cylinders and a solenoid valve 13 associated with the rear driven wheel cylinder, in order to assure effective braking through the anti-skid brake control. These solenoid valves 11, 12 and 13 are employed in a hydraulic unit ABS-HU for an anti-skid brake control system. In addition to the above, the TCS-ECU outputs a lighting command to a TCS failure warning lamp 14 provided for warning the failure in the TCS, and also outputs a lighting command to a TCS operating lamp 15 provided for indicating the operative state of the TCS.

The throttle control module TCM is comprised of a throttle opening angle control circuit mainly employing a throttle motor driving circuit. The TCM receives the first throttle opening angle signal TVO1 generated from a first throttle opening angle sensor 16. As previously described, the TCM outputs the actual throttle opening angle signal DKV indicative of the actual throttle opening angle of the first throttle valve 19 to the TCS-ECU. The TCM also receives the second throttle opening angle signal TVO2 as a feedback information necessary to derive the target throttle opening angle signal value DKR indicative of the target throttle opening angle of the second throttle valve 21 and generates a motor driving current IM to the throttle motor 18 based on the target throttle opening angle signal DKR, so as to approach the second throttle opening angle to the target throttle opening angle signal value. In FIG. 1, $V_{IGN}$ designates an ignition voltage, while $V_B$ designates a battery voltage.

The first throttle valve 19 whose opening angle is detected by the first throttle opening angle sensor 16 is operated sequentially to the depressing movement of an accelerator pedal 20, while the second throttle valve 21 associated with the second throttle opening angle sensor 17 is arranged in series to the first throttle valve 19 in an air intake pipe 22. As appreciated from the above, the opening angle of the second throttle valve is adjusted by means of the throttle motor 18.

Referring now to FIG. 2, there is shown a brake fluid pressure controlling hydraulic system being mainly comprised of the traction brake control hydraulic unit TCS-HU and the anti-skid brake control hydraulic unit ABS-HU. With the two hydraulic units, the brake fluid pressure controlling hydraulic system is applied commonly to the TCS according to which the increase or decrease in the wheel-cylinder pressure can be independently carried out in rear-right and rear-left driven wheels during acceleration slip and the ABS according to which the increasing, decreasing or holding in the wheel-cylinder pressure can be carried out in front-left, front-right, rear-left and rear-right wheel cylinders 31, 32, 33 and 34, during deceleration slip, such as during quick braking. In addition to the TCS-HU and the ABS-HU, the brake fluid pressure control system comprises a brake pedal, a master cylinder 30 generating a master-cylinder pressure based on the magnitude of depressing force applied onto the brake pedal, a pressure accumulator AU, and a hydraulic pump unit PU.

The hydraulic unit ABS-HU includes a pump motor 35, a pair of pumping units 36 having a driven connection with the motor 35, and a pair of pressure accumulators 37 and 38, a front-wheel side brake fluid reservoir 39, a rear-wheel side brake fluid reservoir 40, a front-left wheel side of solenoid valve 117 a front-right wheel side of solenoid valve 12, and a rear-left driven wheel side solenoid valve 9.

The hydraulic unit TCS-HU includes a switching valve 41 arranged for selecting a brake fluid pressure fed from either one of the two hydraulic units TCS-HU and ABS-HU to the rear wheel cylinders, a rear-right wheel side of solenoid valve 10, a rear-left and rear-right driven wheel side of solenoid valve 13, and an oil pressure switch 42.

The pressure accumulator AU comprises a double sealed gas-piston accumulator 43. The pump unit PU comprises a pump motor 44 and a oil pump 46 arranged for supplying brake fluid stored in the reservoir 45 attached onto the master cylinder 30 to the accumulator 43.

During the anti-skid brake control, the switching valve 41 is shifted from a valve open state to a valve closed state in response to a master-cylinder pressure applied to the rear wheel side and serving as a pilot pressure. Additionally, the rear-left wheel side of solenoid valve 9 and the rear-right wheel side of solenoid valve 10 are both maintained in pressure intensifying positions as shown in FIG. 2. Under these conditions, the front-left wheel side of solenoid valve 11, the front-right wheel side of solenoid valve 12, and the rear-left and rear-right driven wheel side of solenoid valve 13 are operatingly controlled in accordance with an external command, so as to perform a desired anti-skid brake control.

During the independent traction brake control executed for the rear driven wheels, the motor 44 is drivingly controlled by means of a relay 47 shown in FIG. 1. The relay 47 is operated in synchronization with the switching operation of the oil pressure switch 42. In accordance with pressurizing operation achieved by the motor 447 the accumulator 43 can accumulate a predetermined brake fluid pressure. Under these conditions, the rear-left wheel side of solenoid valve 9 and the rear-right wheel side of solenoid valve 10 are operatingly controlled in accordance with an external command, so as to perform a desired independent traction brake control, according to which each rear driven wheel cylinder pressure is independently adjusted according to a controlled mode, such as a pressure intensifying mode, a pressure holding mode, and a pressure reducing mode.

The traction control operation of the centralized control unit TCS-ECU will be hereinbelow described in detail in accordance with the flow chart of FIG. 3.

In step 50, a degree $\alpha_T$ of turn of the vehicle is detected. The degree $\alpha_T$ of turn is derived as an estimate of turning radius of the vehicle, for example. The estimate of turning radius is derived on the basis of a lateral acceleration $Y_G$ and a mean value $V_{FTF}$ of the front wheel speed represented as a mean value between the front-right wheel speed $V_{WFR}$ and the front-left wheel speed $V_{WFL}$.

In step 51, the control unit calculates the difference $\Delta\alpha_T$ between a current turning degree $\alpha_T$ and the preceding turning degree $\alpha_{66\ T}$ derived before a predetermined period of time $\Delta T$ sec. The difference of turning degree $\Delta\alpha_T$ is equivalent to ($\alpha_T - \alpha_{\Delta T}$). Through the above difference of turning degree, the control unit can estimate a transition of the turning state.

In step 52, a test is made to determine whether the vehicle is conditioned in a driving torque controlling operation of the driven wheels. When the answer to step 52 is affirmative (YES), the vehicle is conditioned in the torque controlling operation of the rear driven wheels. In this case, the control unit derives a mean value $V_{FTR}$ of the rear wheel speed represented as a mean value of wheel speed between the rear driven wheels, in addition to tile mean value $V_{FTF}$ of the front wheel speed, and further derives the wheel speed difference $\Delta V$ between the two mean values $V_{FTF}$ and $V_{FTF}$. That is the difference $\Delta V$ is equivalent to ($V_{FTR} - V_{FTF}$). The wheel speed difference $\Delta V$ is important to estimate the magnitude of slippage of the driven wheels. Each of the traction throttle control and the traction brake control is performed depending on the magnitude of the wheel speed difference $\Delta V$. Assuming that the wheel speed difference $\Delta V$ exceeds a predetermined threshold for the throttle control, the second throttle valve 21 is closed so as to reduce the driving force generated by the driven wheels. Assuming that the wheel speed difference $\Delta V$ exceeds a predetermined threshold for the brake control, braking forces are applied to the driven wheels, so as to reduce the magnitude of traction.

In step 53, a test is made to determine whether a recovery control should be performed to properly recover the driving torque of the driven wheels. Actually, the control unit judges as to whether the difference $\Delta\alpha_T$ of turning degree is positive or negative. In the preferred embodiment, the control unit performs the recovery control within a particular range in which the difference of turning degree $\Delta\alpha_T$ is negative. Such a negative range is identical with an attenuating range of the turning degree $\alpha_T$, i.e., a transient range from the turning state to the straight-ahead state of the vehicle. If the answer to step 53 is negative, step 54 proceeds wherein a usual driving torque control is performed in a conventional manner which introduces both the throttle control and the brake control in combination in dependence on generation of slip at each of the driven wheels. Conversely, if the answer to step 53 is affirmative, step 55 proceeds wherein a recovery amount $R_T$ is derived in accordance with the magnitude of difference $\Delta\alpha_T$ of turning degree. The control unit executes the recovery control with the controlled recovery amount $R_T$ for the driving torque of the driven wheels. Note that the recovery control means that the second throttle valve 21 is opened in accordance with the magnitude of the controlled recovery amount $R_T$ in case of the traction throttle control and that the brake fluid pressure applied to each of the driven wheels is reduced in accordance with the magnitude of the controlled recovery amount $R_T$ in case of the traction brake control.

As described in more detail, the centralized control unit TCS-ECU operates in a transient state from the straight-ahead driving state to the turning state or vice versa, as follows.

In case of the transient state from straight-ahead driving to turning, the usual driving torque control is performed in such a manner as to reduce traction in the driven wheels by using the throttle control and the brake control in combination, depending on generation of slip of each of the driven wheels. In this manner, the acceleration-slip is assuringly suppressed. In this case, the control procedure flows from step 50 through steps 51, 52 and 53, to step 54 in the flow chart of FIG. 3. As previously described in the prior disclosure, in the above case, the target slip value utilized during straight-ahead driving may be set at a higher value than that utilized during turning, so as to assure a sufficient driving force during straight-ahead driving and to provide a high cornering stability.

Figure 3:
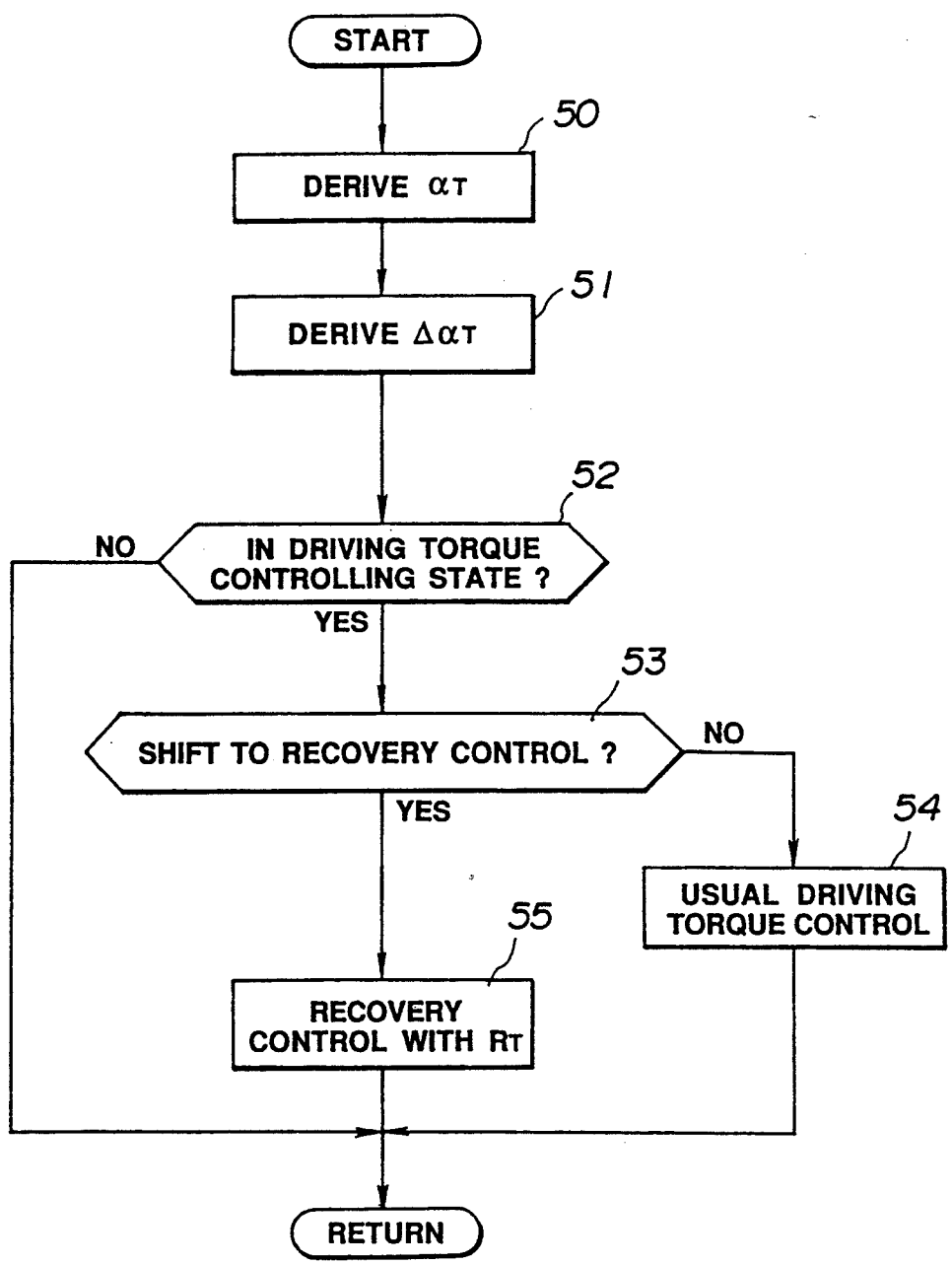
FIG. 3 is a flow chart illustrating a TCS brake control procedure executed by the traction control system according to the invention.

In case of the transient state from turning to straight-ahead driving, the control procedure flows from step 50, through steps 51, 52 and 53 to step 55, as shown in FIG. 3.

Figure 4:
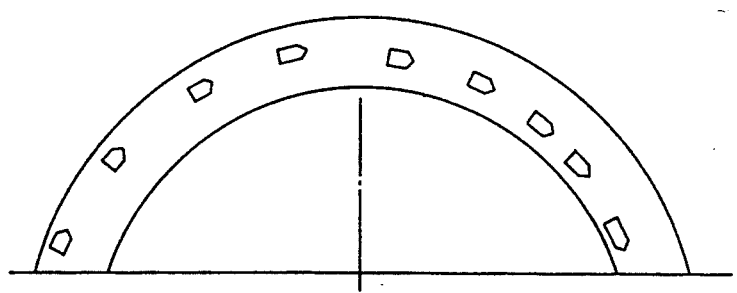
FIG. 4 is a schematic plan view illustrating one cornering state of the vehicle.
Figure 5:
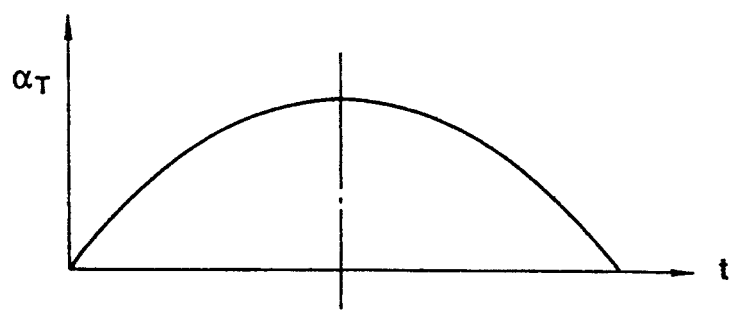
FIG. 5 is a graph illustrating a characteristic curve of degree of turn of the vehicle, during cornering.
Figure 6:
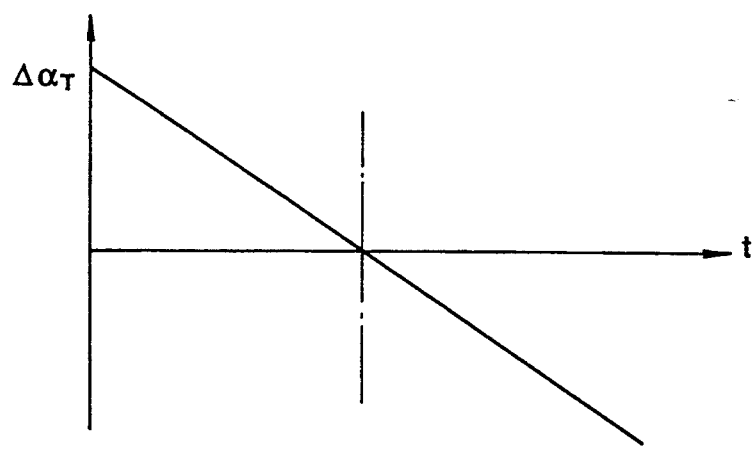
FIG. 6 is a graph illustrating a variation of the difference between consecutively monitored degrees of the vehicle turn.
Figure 7:
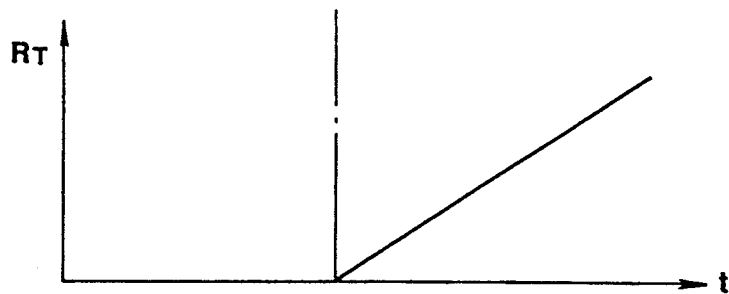
FIG. 7 is a graph illustrating a variation of controlled rotational torque recovery in a driven wheel.

As shown in FIG. 4, when the vehicle turns to the right and the vehicle running state is shifted from the turning state to the straight-ahead driving state, the degree $\alpha_T$ of turn derived in step 50 varies in accordance with a substantially parabolic curve illustrated in FIG. 5. As appreciated from the parabolic curve, the turning degree $\alpha_T$ is gradually decreased in the latter half of the vehicle turning. In this case, the difference $\Delta\alpha_T$ of turning degree varies in accordance with a substantially straight line illustrated in FIG. 6. As seen in FIG. 6, in the latter half of turning the difference $\Delta\alpha_T$ is negative, while in the former half of the turning the difference $\Delta\alpha_T$ is positive. In the latter half of turning, the negative value of the difference $\Delta\alpha_T$ is gradually increased, as the vehicle running state approaches to the straight-ahead driving state. As shown in FIG. 7, the controlled recovery amount $R_T$ for the driving torque is zero at the time point where the difference $\Delta\alpha_T$ of turning degree changes from a positive value to a negative value, and gradually increased from the changing point, in proportion to the magnitude of the difference $\Delta\alpha_T$ of turning degree. As set forth above, in case of the transient state from turning to straight-ahead driving, the centralized control unit TCS-ECU performs the recovery control with the controlled recovery amount $R_T$.

As will be appreciated from the above, in the former half of the vehicle turning in the transient state from turning to straight-ahead driving, i.e., when the turning degree is significant, the usual driving torque control gets priority over the recovery control, since the recovery amount $R_T$ is substantially zero. It is advantageous that a cornering stability is mainly enhanced by suppressing the driven-wheel slip through the usual driving torque control. On the other hand, in the latter half of the vehicle turning in the transient state, i.e., when the turning degree is lesser, the recovery control gets priority over the usual driving torque control, since the recovery amount $R_T$ becomes increased in substantially proportion to the magnitude of the difference $\Delta\alpha_T$ of turning degree. In the latter half, it is very advantageous that an acceleration performance is mainly enhanced due to smooth and quick recovery of the driving torque for the driven wheels through the recovery control. In this manner, the important point of the traction control executed in the transient state is gradually shifted from the cornering stability to the acceleration performance. Therefore, the traction control system according to the present invention can insure a suitable balance between the cornering stability and the acceleration performance in a transient state from cornering to straight-ahead driving.

Although the degree $\alpha_T$ of turning is derived on the basis of both the lateral acceleration $Y_G$ and the mean front wheel speed $V_{FTF}$, the turning degree $\alpha_T$ may be derived on the basis of only the lateral acceleration $Y_G$, a turning radius itself, a steering angle, a difference between left and right non-driven wheels, or a yawing rate.

Although the transient turning state is estimated through the difference $\Delta\alpha_T$ of turning degree between the consecutive two turning degrees periodically derived at a predetermined period of time, the difference $\Delta\alpha_T$ may be replaced by the difference between the periodically derived consecutive two turning radii, steering angles, yawing rates, or the like.

In the preferred embodiment, although the traction control system contributes to both the traction throttle control and the traction brake control in combination, the system may merely execute either one of a first control according to which braking force is applied to the respective driven wheel and a second control according to which an output power of the internal combustion engine is varied. As the above second control, there is a fuel-cut control or an ignition timing retarding control, in addition to the traction throttle control.

In the embodiment, the recovery amount $R_T$ corresponds to a reduction amount of braking force controlling the magnitude of driving torque applied to the driven wheel. The recovery amount may be replaced by an increasing amount of the throttle valve opening speed or a decreasing amount of a predetermined threshold slip value for the driven wheel.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. A traction control system for an automotive vehicle, comprising:
    a traction reducing means for reducing traction created through at least one driven wheel, said traction reducing means being operated during an acceleration-slip control;
    an acceleration-slip detecting means for monitoring an acceleration-slip state of said at least one driven wheel;
    a turning degree deriving means for deriving a degree of turn of the vehicle;
    a change-rate derivation means for deriving a rate of change in said turning degree; and
    a driving-torque recovery control means for increasingly compensating a recovery amount of driving torque created by said at least one driven wheel in accordance with a decrease in the turning degree of the vehicle, during the acceleration-slip control when said recovery control means determines on the basis of the rate of change in the turning degree that the vehicle is in a transient state from turning to straight-ahead driving.

2. A traction control system for an automotive vehicle, comprising:
    a traction reducing means for reducing traction created through at least one driven wheel, said traction reducing means being operated during an acceleration-slip control;
    an acceleration-slip detecting means for monitoring an acceleration-slip state of said at least one driven wheel;
    a turning degree deriving means for deriving a degree of turn of the vehicle;
    a change-rate derivation means for deriving a rate of change in said turning degree; and
    a driving-torque recovery control means for increasingly compensating a recovery amount of driving torque created by said at least one driven wheel in linear proportion to an increase in a negative change-rate in the turning degree, during the acceleration-slip control when said recovery control means determines on the basis of the rate of change in the turning degree that the vehicle is in a transient state from turning to straight-ahead driving.

3. The traction control system as set forth in claim 2, wherein:
    said turning degree is derived as an estimate of turning radius of the vehicle, based on a lateral acceleration and a mean value between a front-right wheel speed and a front-left wheel speed.

4. The traction control system as set forth in claim 2, wherein:
    said turning degree is derived on the basis of one of a steering angle and a yawing rate.

5. The traction control system as set forth in claim 2, wherein:
    said change-rate in turning degree is derived from a difference of turning degree between two consecutive turning degrees periodically derived at a predetermined period of time.

6. The traction control system as set forth in claim 2, wherein:
    the recovery control means operates said traction reducing means in said transient state shifting from turning to straightahead driving during the acceleration-slip control, such that a brake fluid pressure in each driven wheel cylinder is reduced linearly in proportion to the magnitude of said recovery amount.

7. A traction control system for an automotive vehicle, comprising:
    a traction reducing means for reducing traction created through at least one driven wheel, said traction reducing means being operated during an acceleration-slip control;
    an acceleration-slip detecting means for monitoring an acceleration-slip state of said at least one driven wheel;
    a turning degree deriving means for deriving a degree of turn of the vehicle;
    a change-rate derivation means for deriving a rate of change in said turning degree;

a driving-torque recovery control means for increasingly compensating a recovery amount of driving torque created by said at least one driven wheel in linear proportion to an increase in a negative change-rate in the turning degree, during the acceleration-slip-control when said recovery control means determines on the basis of the rate of change in the turning degree that the vehicle is conditioned in a transient state from turning to straight-ahead driving;

tandem throttle valves, comprising a first throttle valve operated in synchronization with a depression of an acceleration pedal and a second throttle valve controlled by a motor;

wherein said recovery control means operates said traction reducing means in said transient state during the acceleration-slip control, such that a throttle opening angle of said second throttle valve is increased in linear proportion to a magnitude of said recovery amount.

8. The traction control system as set forth in claim 7, wherein said recovery control means operates said traction reducing means in said transient state shifting from turning to straight-ahead driving during the acceleration-slip control, such that a throttle opening speed of said second throttle valve is increased in linearly proportion to the magnitude of said recovery amount.

* * * * *